United States Patent
Chandramouli et al.

(10) Patent No.: US 10,061,845 B2
(45) Date of Patent: Aug. 28, 2018

(54) ANALYSIS OF UNSTRUCTURED COMPUTER TEXT TO GENERATE THEMES AND DETERMINE SENTIMENT

(71) Applicant: FMR LLC, Boston, MA (US)

(72) Inventors: Aravind Chandramouli, Tamil Nadu (IN); Vrushali Karnik, Mumbai (IN); Javeed Bani, Bijapur (IN); Divik Saxena, Bengaluru (IN); Madhuri Gupta, Kolkata (IN)

(73) Assignee: FMR LLC, Boston, MA (US)

( * ) Notice: Subject to any disclaimer, the term of this patent is extended or adjusted under 35 U.S.C. 154(b) by 328 days.

(21) Appl. No.: 15/047,527

(22) Filed: Feb. 18, 2016

(65) Prior Publication Data

US 2017/0242919 A1    Aug. 24, 2017

(51) Int. Cl.
*G06F 7/00* (2006.01)
*G06F 17/30* (2006.01)

(52) U.S. Cl.
CPC .. *G06F 17/30684* (2013.01); *G06F 17/30867* (2013.01)

(58) Field of Classification Search
None
See application file for complete search history.

(56) References Cited

U.S. PATENT DOCUMENTS

| | | |
|---|---|---|
| 6,970,881 B1 | 11/2005 | Mohan et al. |
| 7,536,413 B1 | 5/2009 | Mohan et al. |
| 8,719,308 B2 | 5/2014 | Xiong et al. |
| 9,092,789 B2 | 7/2015 | Anshul |
| 2005/0278362 A1 | 12/2005 | Maren et al. |
| 2006/0242190 A1 | 10/2006 | Wnek |
| 2007/0011175 A1 | 1/2007 | Langseth et al. |
| 2007/0011183 A1 | 1/2007 | Langseth et al. |
| 2010/0017487 A1 | 1/2010 | Patinkin |
| 2010/0312769 A1 | 12/2010 | Bailey et al. |
| 2013/0024389 A1 | 1/2013 | Gupta |
| 2013/0231920 A1 | 9/2013 | Mathew et al. |
| 2013/0268534 A1 | 10/2013 | Mathew et al. |
| 2015/0154193 A1 | 6/2015 | Dave et al. |
| 2016/0042069 A1* | 2/2016 | Lee-Goldman ............ G06F 17/30864 707/706 |
| 2016/0147893 A1* | 5/2016 | Mashiach ......... G06F 17/30867 707/710 |

\* cited by examiner

*Primary Examiner* — Thu Nga Nguyen
(74) *Attorney, Agent, or Firm* — Proskauer Rose LLP

(57) ABSTRACT

Methods and apparatuses are described for analyzing unstructured computer text for theme generation to determine sentiment. A computer store stores unstructured text that is delimited, a searched phrases log, and a phrase click log. A computer server extracts phrases from the unstructured delimited text by splitting each line of the unstructured delimited text into one or more phrases. The computer server generates tokens from the unstructured delimited text, where the tokens comprise segments of the unstructured delimited text. The computer server determines one or more themes present in the unstructured delimited text.

8 Claims, 4 Drawing Sheets

ANALYSIS OF UNSTRUCTURED COMPUTER TEXT TO GENERATE THEMES AND DETERMINE SENTIMENT

TECHNICAL FIELD

This application relates generally to methods and apparatuses, including computer program products, for analysis of unstructured computer text to generate themes and determine sentiment.

BACKGROUND

With the advent of computer-based communications, the concept of text can mean many different things, such as online surveys, feedback forms, chat dialog, social media interactions and conversations, and so forth. These types of unstructured computer text are present across all business domains in a variety of forms. More often than not, companies and other business entities obtain this unstructured computer text in the form of unstructured data, but fail to put the unstructured computer text to use in understanding customer/employee needs, sentiment, and morale because detailed analysis of the unstructured text requires substantial manual processing time and many times companies lack a proper computerized analysis tool.

Most of the available analysis tools limit the analysis to a thematic text tagging and, even if they do touch upon sentiment analysis, the accuracy is questionable. Also having tagged text, there is still a gap in being able to merge quantitative data to the tagged text for a better insightful understanding of processes/problems and/or systems.

SUMMARY

Therefore, methods and systems are needed to quantify unstructured computer text in real time that can be used in statistical applications/data analysis and interpretation to understand themes and sentiment present in the unstructured text. The techniques described herein provide the advantage of analyzing unstructured computer text (also called verbatims) in order to:
  Identify and tag themes present in the text;
  Identify and tag tonality of the themes;
  Profile respondents to understand aspects of the respondents that have provided positive and/or negative feedback on a particular theme;
  Use the tagged text as quantitative data in statistical analysis; and
  Generate a robust graphical user interface to assist with effective interpretation of the tagged text.

The present methods, systems, and techniques can be advantageously implemented in a variety of real-world applications, including but not limited to
  Unstructured computer text captured as a part of human resources applications such as employee engagement surveys, employee exit interviews, training feedback forms, and manager feedback forms;
  Unstructured computer text captured as a part of customer-facing applications, such as customer feedback forms, customer interactions such as emails, phone logs, customer call center records, attitudinal data, and customer relationship management data; and
  Unstructured computer text captured as a part of social media applications, such as blog posts, chat logs, Facebook™ profiles and posts, Twitter™ posts, and so forth.

The invention, in one aspect, features a system used in a computing environment in which unstructured computer text is analyzed for theme generation to determine sentiment. The system comprises a computer store including unstructured text that is delimited, a searched phrases log, and a phrase click log. The unstructured text is input via a web page, input directly into the computer store via a first computer file, or any combination thereof. The searched phrases log comprises a) a unique set of phrases from all phrases that are searched on one or more specified websites for a specified duration and b) a search phrase frequency count indicating the number of times of the phrases within the unique set of phrases was searched on the one or more specified websites over the specified duration, the searched phrases log being i) retrieved from the internet and stored in the computer store via a second computer file, ii) input directly into the computer store via a third computer file, or any combination of i) and ii). The phrase click log comprises a) a unique set of phrases from all phrases that correspond to one or more Uniform Resource Locators (URLs) that are activated for a specified duration and b) a clicked-on frequency count indicating the number of times of the URLs associated with the phrases in the unique set of phrases are activated over the specified duration, the phrase click log is i) retrieved from the internet and stored in the computer store via a fourth computer file, ii) input via a webpage, input directly into the computer store via a fifth computer file, or any combination of i) and ii). The system further comprises a computer server in communication with the computer store. The computer server extracts phrases from the unstructured delimited text by splitting each line of the unstructured delimited text into one or more phrases. The computer server generates tokens from the unstructured delimited text where the tokens comprise segments of the unstructured delimited text. The computer server determines one or more themes present in the unstructured delimited text by: a) identifying candidate phrases based on the tokens and the searched phrases log, b) ranking each of the candidate phrases based on frequency of a respective phrase in the unstructured delimited text, the search phrase frequency count corresponding to the respective phrase, and the clicked-on frequency count corresponding to the respective phrase, c) selecting a subset of phrases from the candidate phrases, where the subset of phrases selected is based on the respective rank of each phrase, d) grouping the subset of phrases based on words in the subset of phrases, and e) determining themes for each grouping based on the number of times a phrase appears in the group.

The invention, in another aspect, features a computerized method for analyzing unstructured computer text for theme generation to determine sentiment. A computer store stores unstructured text that is delimited, a searched phrases log, and a phrase click log, where the unstructured text is input via a web page, input directly into the computer store via a first computer file, or any combination thereof, where the searched phrases log comprises a) a unique set of phrases from all phrases that are searched on one or more specified websites for a specified duration and b) a search phrase frequency count indicating the number of times of the phrases within the unique set of phrases was searched on the one or more specified websites over the specified duration, the searched phrases log being i) retrieved from the internet and stored in the computer store via a second computer file, ii) input directly into the computer store via a third computer file, or any combination of i) and ii), and where the phrase click log comprises a) a unique set of phrases from all phrases that correspond to one or more Uniform Resource Locators (URLs) that are activated for a specified duration and b) a clicked-on frequency count indicating the number of times of the URLs associated with the phrases in the unique set of phrases are activated over the specified duration, the phrase click log being i) retrieved from the internet and stored in the computer store via a fourth computer file, ii) input via a webpage, input directly into the computer store via a fifth computer file, or any combination of i) and ii). A computer server in communication with the computer store extracts phrases from the unstructured delimited text by splitting each line of the unstructured delimited text into one or more phrases. The computer server generates tokens from the unstructured delimited text, where the tokens comprise segments of the unstructured delimited text. The computer store determines one or more themes present in the unstructured delimited text by identifying candidate phrases based on the tokens and the searched phrases log, ranking each of the candidate phrases based on frequency of a respective phrase in the unstructured delimited text, the search phrase frequency count corresponding to the respective phrase, and the clicked-on frequency count corresponding to the respective phrase, selecting a subset of phrases from the candidate phrases, where the subset of phrases selected is based on the respective rank of each phrase, grouping the subset of phrases based on words in the subset of phrases, and determining themes for each grouping based on the number of times a phrase appears in the group.

Any of the above aspects can include one or more of the following features. In some embodiments, grouping the subset of phrases is based on trigrams in the subset of phrases that substantially match. In some embodiments, grouping the subset of phrases is based on a co-occurrence of matching words in the subset of phrases. In some embodiments, determining themes further comprises picking the phrase that appears in the group a highest number of times.

The invention, in another aspect, features a system used in a computing environment in which computer text is captured and analyzed for sentiment. The system includes a computer store including a data theme dictionary and a tonality dictionary, where the theme dictionary and the tonality dictionary are input via a web page or input directly into the computer store via a computer file. The system includes a computer server in communication with the computer store. The computer server receives from a web page or a computer file one or more lines of delimited text. The computer server separates each line of delimited text into one or more phrases. The computer server determines a theme for each of the one or more phrases based on the theme dictionary. The computer server determines a tone for each of the one or more phrases based on the corresponding theme. The computer server assigns a value to each of the one or more phrases, the value based on a degree of positive, negative, or suggestive sentiment of the respective text phrase. The computer server determines a sentiment value for each line of delimited text by aggregating the values for each of the one or more phases of the respective line.

The invention, in another aspect, features a computerized method for capturing computer text and analyzing the computer text for sentiment. A computer store receives and stores a data theme dictionary and a tonality dictionary, where the theme dictionary and the tonality dictionary are input via a web page or input directly into the computer store via a computer file. A computer server in communication with the computer store receives one or more lines of delimited text from a web page or a computer file. The computer server separates each line of delimited text into one or more phrases. The computer server determines a theme for each of the one or more phrases based on the theme dictionary. The computer server determines a tone for each of the one or more phrases based on the corresponding theme. The computer server assigns a value to each of the one or more phrases, the value based on a degree of positive, negative or suggestive sentiment of the respective text phrase. The computer server determines a sentiment value for each line of delimited text by aggregating the values for each of the one or more phases of the respective line.

Any of the above aspects can include one or more of the following features. In some embodiments, the degree of positive, negative or suggestive sentiment is determined by assigning each modifier in the respective text phrase a positive, neutral, or suggestive value and aggregating the positive, neutral, or suggestive values in each respective text phrase. In some embodiments, separating each line of delimited text further comprises identifying one or more sentence completion(s), conjunction(s), or preposition(s), and separating the phrase at the identified one or more sentence completion(s), conjunction(s), or preposition(s). In some embodiments, determining a theme for each of the one or more phrases based on the theme dictionary further comprises assigning each of the one or more phrases with matching words from the theme dictionary. In some embodiments, determining a tone for each of the one or more phrases based on the tonality dictionary further comprises identifying a location of the theme in each of the one or more phrases based on one or more theme keywords, and assigning a tonality to each of the one or more phrases if for each of the one or more phrases one to four words of a respective phrase of the one or more phrases satisfies tonality dictionary rules. In some embodiments, determining a tone for each of the one or more phrases based on the tonality dictionary further comprises a tonality to each of the one or more phrases if for each of the one or more phrases a first word of a respective phrase of the one or more phrases or a second word of a respective phrase of the one or more phrases are in the tonality dictionary.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
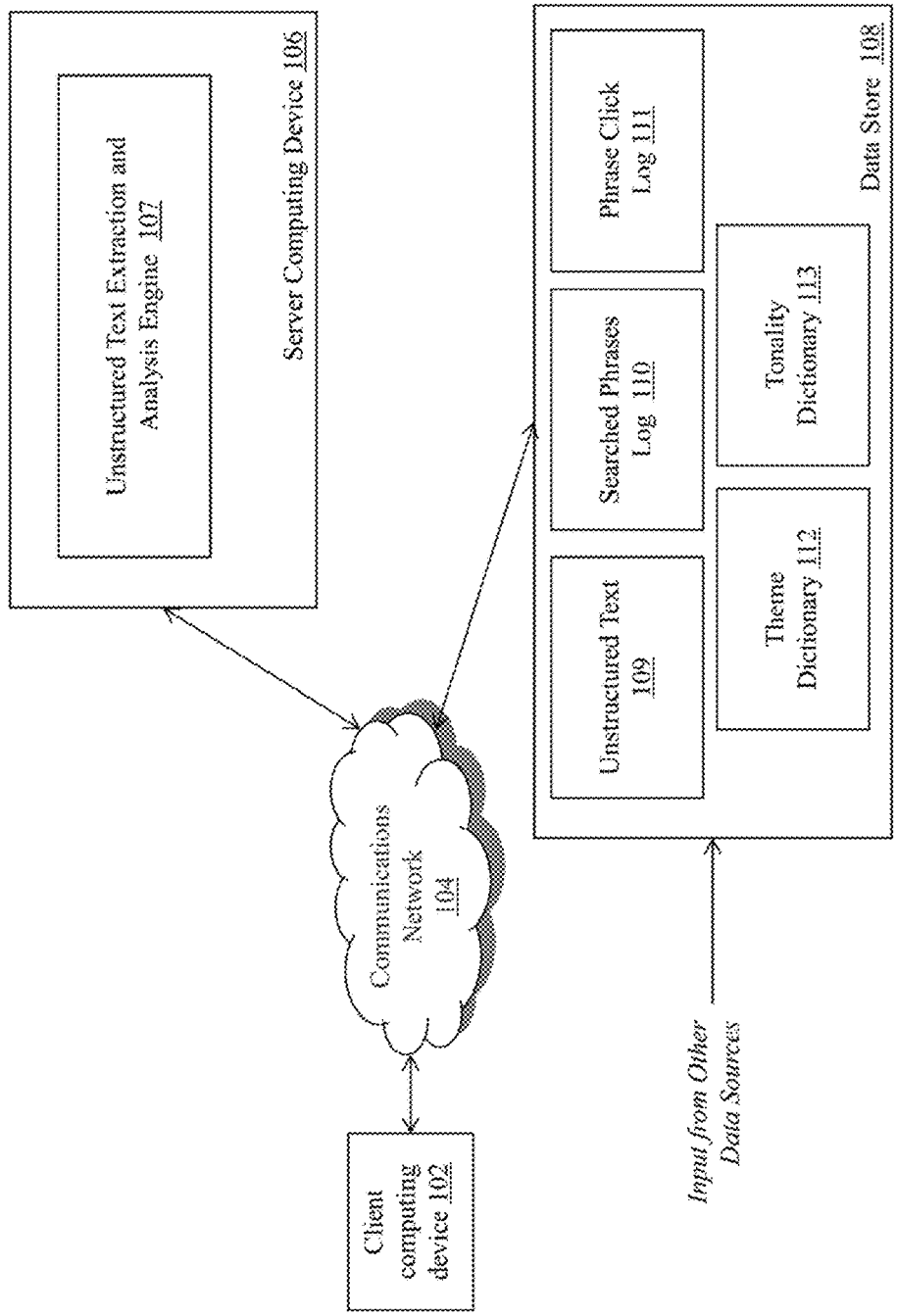
FIG. 1 is a block diagram of a system for analyzing unstructured computer text to generate themes and determine sentiment.

FIG. 1 is a block diagram of a system 100 for analyzing unstructured computer text to generate themes and determine sentiment. The system 100 includes a client computing device 102, a communications network 104, a server computing device 106 with an unstructured text analysis and extraction engine 107, and a data store 108 with unstructured delimited text 109, a searched phrases log 110, a phrase click log 111, a theme dictionary 112, and a tonality dictionary 113.

The client computing device 102 connects to the communications network 104 in order to communicate with the server computing device 106 to provide input and receive output relating to the process of analyzing unstructured computer text to generate themes and determine sentiment, as described herein. For example, client computing device 102 can provide a detailed graphical user interface (GUI) that presents output resulting from the analysis methods and systems described herein, where the GUI is utilized by a human resources, sales and/or marketing professional to understand themes and sentiment associated with particular feedback received from customers or employees.

Exemplary client devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single client device 102, it should be appreciated that the system 100 can include any number of client devices. And as mentioned above, in some embodiments the client device 102 also includes a display for receiving data from the server computing device 106 and displaying the data to a user of the client device 102.

The communication network 104 enables the other components of the system 100 to communicate with each other in order to perform the process of analyzing unstructured computer text to generate themes and determine sentiment, as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a combination of hardware and software modules that includes specialized hardware and/or software engines that execute on a processor and interact with memory modules of the server computing device 106, to receive data from other components of the system 100, transmit data to other components of the system 100, and perform functions for analyzing unstructured computer text to generate themes and determine sentiment, as described herein. The server computing device 106 includes an unstructured text analysis and extraction engine 107 that executes on the processor of the server computing device 106. In some embodiments, the unstructured text analysis and extraction engine 107 is a specialized set of computer software instructions programmed onto a dedicated processor in the server computing device 106 and can include specifically-designated memory locations and/or registers for executing the specialized computer software instructions. Further explanation of the specific processing performed by the unstructured text analysis and extraction engine 107 will be provided below.

The data store 108 is a computing device (or in some embodiments, a set of computing devices) that is coupled to the server computing device 106 and is configured to receive, generate, and store specific segments of data relating to the process of analyzing unstructured computer text to generate themes and determine sentiment, as described herein. In some embodiments, all or a portion of the data store 108 can be integrated with the server computing device 106 or be located on a separate computing device or devices. For example, the data store 108 can comprise one or more databases, such as MySQL™ available from Oracle Corp. of Redwood City, Calif. The data store 108 includes unstructured text 109, a searched phrases log 110, and a phrase click log 111.

The unstructured text 109 is received and stored by the data store 108 via input from a web site/web page, or the unstructured text 109 is received and stored directly into the computer store by utilizing a first computer file (e.g., XML, CSV, TXT). For example, a user at client computing device 102 can utilize a GUI provided by the client computing device 102 to select and/or input the unstructured text (e.g. directly and/or as a computer file) and transmit the text to the data store 108. In another example, the data store 108 can retrieve the unstructured text from one or more repositories and/or computing systems (e.g., as a data feed and/or a file), such as customer relationship management systems, customer/employee feedback or survey systems, social media systems, human resources systems, and so forth.

The searched phrases log 110 comprises data relating to a) a unique set of phrases from all phrases that are searched on one or more specified websites (e.g., URLs) for a specified duration and b) a search phrase frequency count indicating the number of times of the phrases within the unique set of phrases was searched on the one or more specified websites over the specified duration, the searched phrases log being i) retrieved from the internet and stored in the computer store via a second computer file, ii) input directly into the computer store via a third computer file, or any combination of i) and ii). In some embodiments, the server computing device 106 includes processing capability to perform the website searching described above to provide the data used by the data store 108 to generate the searched phrases log 110. In some embodiments, the data store 108 receives the data comprising the searched phrases log 110 from another source or computing device not shown in FIG. 1 (e.g., received from the internet). In some embodiments, the data store 108 receives the data and generates the searched phrases log 110 by allocating storage space and/or memory to contain the searched phrases log 110 and parsing and structuring the data according to a specific data scheme in order to optimize later retrieval and processing of the searched phrases log 110 by the text analysis and extraction engine 107 of server computing device 106. In some embodiments, the server computing device 106 coordinates with the data store 108 to perform the data ingestion and structuring in order to generate the searched phrases log 110.

The phrase click log 111 comprises a) a unique set of phrases from all phrases that are associated with one or more specified websites identified by URLs for a specified duration and b) a clicked-on frequency count indicating the number of times that the URL associated with the phrase in the unique set of phrases was clicked on over the specified duration, the phrase click log being i) retrieved from the internet and stored in the computer store via a fourth computer file, ii) input via a webpage, input directly into the computer store via a fifth computer file, or any combination of i) and ii). In some embodiments, the server computing device 106 includes processing capability to perform the website searching described above to provide the data used by the data store 108 to generate the phrase click log 111. In some embodiments, the data store 108 receives the data comprising the phrase click log 111 from another source or computing device not shown in FIG. 1 (e.g., received from the internet). In some embodiments, the data store 108 receives the data and generates the phrase click log 111 by allocating storage space and/or memory to contain the phrase click log 111 and parsing and structuring the data according to a specific data scheme in order to optimize later retrieval and processing of the phrase click log 111 by the text analysis and extraction engine 107 of server computing device 106. In some embodiments, the server computing device 106 coordinates with the data store 108 to perform the data ingestion and structuring in order to generate the phrase click log 111.

The theme dictionary 112 comprises a conglomeration of themes, associated phrases, keywords and synonyms. As will be described in greater detail below, the theme dictionary 112 includes specific themes, keywords, synonyms, and phrases as entered by a user and/or uploaded to the data store 108 via a computer file. The theme dictionary 112 is used by the unstructured text analysis and extraction engine 107 to assist in determining tonality and sentiment of a verbatim. In some embodiments, the engine 107 provides themes and associated phrases that it has determined from unstructured text back to the theme dictionary 112 for use in subsequent analysis of incoming verbatims/unstructured text.

Similarly, the tonality dictionary 113 comprises a set of rules, words, phrases, and the like that are associated with a tone (e.g., positive, negative). For example, the word "good" can be associated with a positive tone, while the word "bad" can be associated with a negative tone. As will be described in greater detail below, the engine 107 can use the tonality dictionary when it determines tonality and sentiment of a verbatim. Appendix A attached hereto provides examples of rules that can be stored in the tonality dictionary 113 for determination of positive, negative, and suggestive tonality and sentiment.

Figure 2:
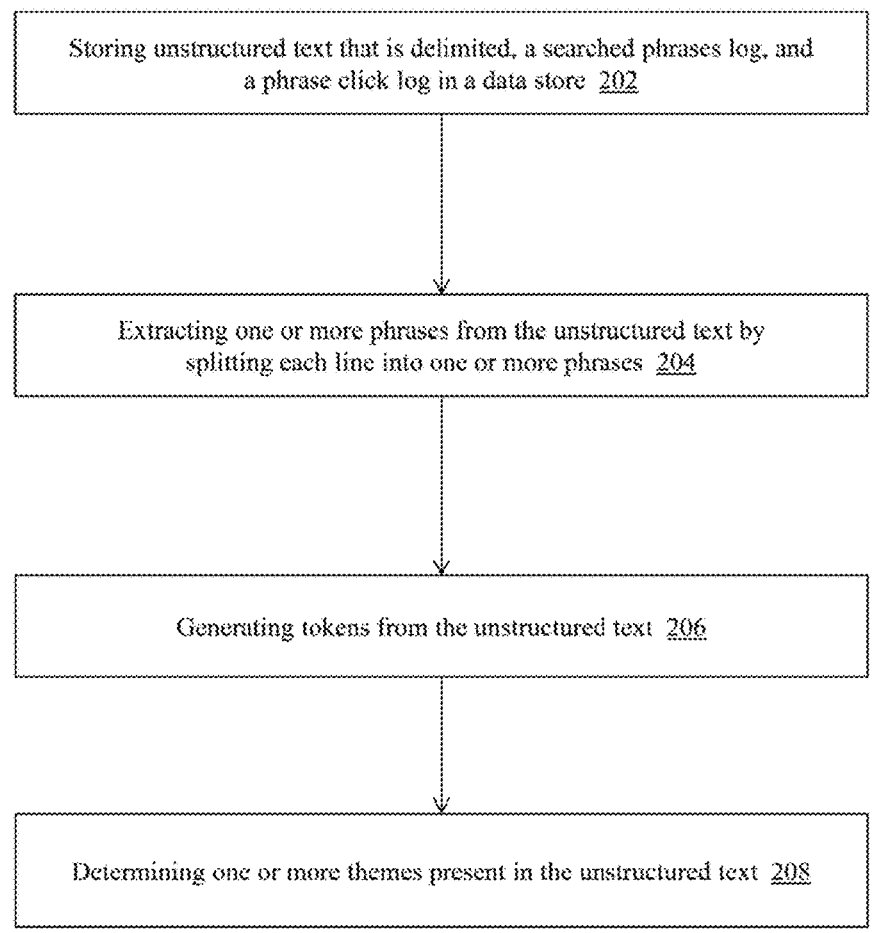
FIG. 2 is a flow diagram of a method for analyzing unstructured computer text to generate themes and determine sentiment.

FIG. 2 is a flow diagram of a method 200 for analyzing unstructured computer text to generate themes and determine sentiment, using the system 100 of FIG. 1. The data store 108 stores (202) unstructured text 109 that is delimited, the searched phrases log 110, and the click phrase log 111. The text analysis and extraction engine 107 of server computing device 106 extracts (204) one or more phrases from the unstructured text 109 by splitting each line into one or more phrases. The text analysis and extraction engine 107 generates (206) tokens from the unstructured text 109. The text analysis and extraction engine 107 determines (208) one or more themes in the unstructured text 109.

Figure 3:
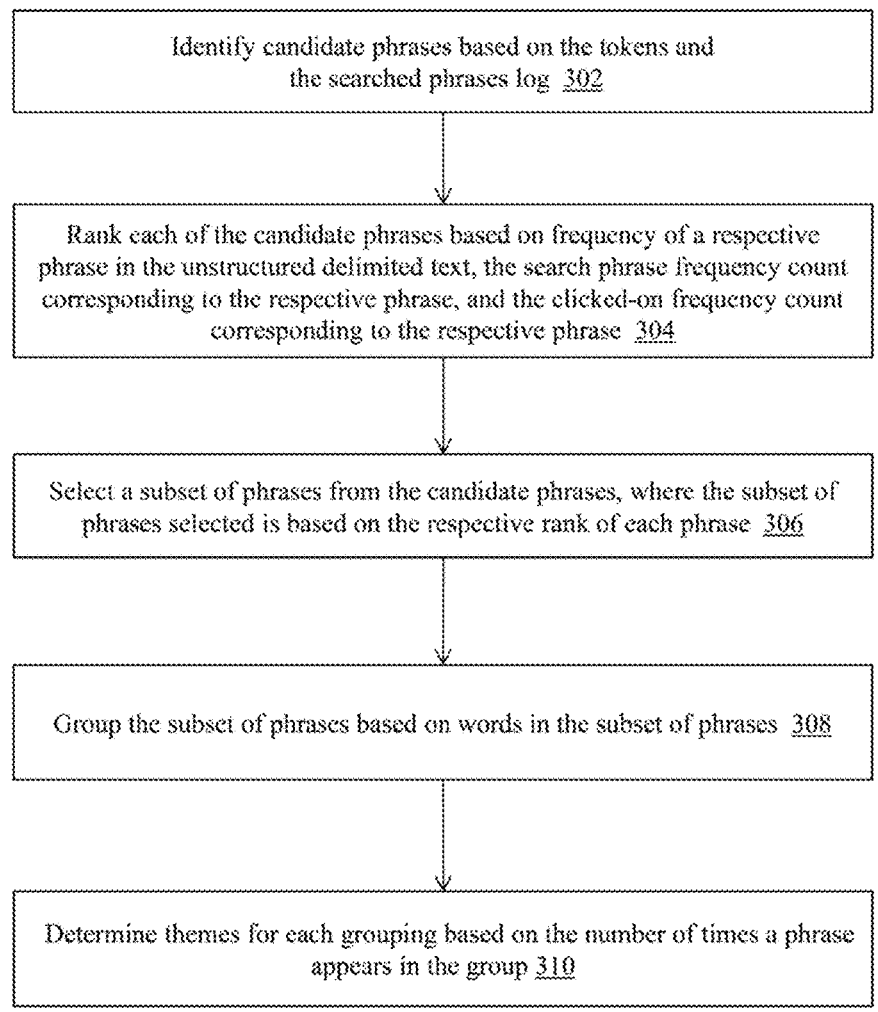
FIG. 3 is a flow diagram of a method for determining one or more themes present in unstructured text.

A detailed flow diagram of a method 300 for determining one or more themes in the unstructured text is shown in FIG. 3. For this step (208), the text analysis and extraction engine 107 identifies (302) candidate phrases based upon the tokens and the searched phrases log 110. The text analysis and extraction engine 107 ranks (304) each of the candidate phrases based on frequency of a respective phrase in the unstructured delimited text 109, the search phrase frequency count corresponding to the respective phrase, and the clicked-on frequency count corresponding to the respective phrase. The text analysis and extraction engine 107 selects (306) a subset of phrases from the candidate phrases, where the subset of phrases selected is based on the respective rank of each phrase. The text analysis and extraction engine 107 groups (308) the subset of phrases based on words in the subset of phrases. The text analysis and extraction engine 107 determines (310) themes for each grouping based on the number of times a phrase appears in the group. Further explanation of the steps of method 200 in FIG. 2 and method 300 in FIG. 3 are provided below.

Turning back to FIG. 2, the data store 108 receives and stores (202) unstructured text 109 that is delimited, and the searched phrases log 110 and the click phrase log 111. For example, a user at client computing device 102 can enter and/or upload strings of unstructured text (also called verbatims), each of which corresponds to feedback (e.g., provided by customers and/or employees) to be analyzed for themes and sentiment by the text analysis and extraction engine 107. One example of a verbatim is "Work culture has improved considerably. Employee morale is low in the area I work in." The unstructured text provided by the client computing device 102 can be delimited, meaning that each verbatim is separated by a specific delimination character or set of delimination characters (e.g., an asterisk or a semicolon) in order for the data store 108 to quickly and efficiently segment the entire set of verbatims into each individual verbatim. In one example, the client computing device 102 can generate a computer file by adding each verbatim to the file and separating them by the specific delimination character(s). It should be appreciated that, based upon the content of the verbatims, the system should choose a delimination character that is unique or does not regularly appear in the verbatims to ensure that the verbatims are not erroneously parsed by the client computing device 102 and/or data store 108.

The data that comprises the searched phrases log 110 and the click phrase log 111 are similarly stored as delimited data sets for processing by the data store 108 and/or text analysis and extraction engine 107. As mentioned above, the searched phrases log 110 includes a unique set of phrases from all phrases that are searched on one or more specified websites for a specified duration. For example, a customer and/or employee feedback website may include a survey form where a user inputs specific unstructured text into the form as feedback in response to questions. In some embodiments, this unstructured text is received by the data store 108 and analyzed to generate the unique set of phrases that are contained within the unstructured text. In some embodiments, the data store 108 receives the unique set of phrases as a structured log that was generated and formatted by an external data source (e.g., the feedback website). The searched phrases log 110 also includes a search phrase frequency count indicating the number of times that the phrases within the unique set of phrases were searched on the one or more specified websites over the specified duration. As described above, in some embodiments the searched phrases log is i) retrieved from an external source (e.g., the internet) and stored in the computer store using a computer file, ii) input directly into the computer store (e.g., from the client computing device 102) using a different computer file, or any combination of i) and ii).

The table below is an example of a searched phrases log 110 used as part of the invention described herein:

| Phrase | Search Phrase Frequency Count |
| --- | --- |
| mobile app | 1250 |
| IRA account | 2650 |
| app usage | 1000 |

Like the searched phrases log 110, the phrase click log 111 comprises a) a unique set of phrases from all phrases that are associated with one or more specified websites identified by URLs for a specified duration and b) a clicked-on frequency count indicating the number of times that the URL associated with the phrase in the unique set of phrases was clicked on over the specified duration. For example, a URL may itself contain a specific phrase (e.g., 'account'), correspond to a webpage relating to specific subject matter (e.g., instructions for opening an IRA account, instructions for operating a mobile application) and/or correspond to a webpage containing certain phrases in the webpage itself and/or in the metadata of the webpage. When a user clicks on or navigates to the URL, the system 100 increments a click count associated with both the phrase and the URL (e.g., to keep track of how many times a specific URL and phrase combination is accessed). In some embodiments, the phrase click log 111 is i) retrieved from the internet and stored in the computer store via a computer file, ii) input via a webpage, input directly into the computer store via a different computer file, or any combination of i) and ii).

The table below is an example of a phrase click log 111 used as part of the invention described herein:

| Phrase | Related URLs | Click Count |
|---|---|---|
| mobile app | https://www.fidelity.com/mobile/overview | 500 |
| mobile app | https://www.fidelity.com/mobile/mobile-security | 300 |
| IRA account | https://www.fidelity.com/open-account/overview | 4000 |
| IRA account | https://www.fidelity.com/retirement-planning/learn-about-iras/what-is-an-ira | 5000 |
| app usage | http://www.fidelitycharitable.org/2013-annual-report/annual-letter.shtml | 250 |

Returning to FIG. 2, the unstructured text analysis and extraction engine 107 of server computing device 106 extracts (204) one or more phrases from the unstructured text 109 by splitting each line of unstructured text into one or more phrases. In some embodiments, the unstructured text analysis and extraction engine 107 utilizes logic to locate a terminator within each line of unstructured text and split the line of text into multiple phrases at each terminator. Using the example verbatim above, the engine 107 receives the verbatim "Work culture has improved considerably. Employee morale is low in the area I work in." The engine 107 locates the period after the word "considerably" and determines that the period is a terminator—meaning that a specific thought or concept has completed. The engine 107 splits the verbatim into two phrases, namely "Work culture has improved considerably" and "Employee morale is low in the area I work in." Other types of terminators can include but are not limited to conjunctions or prepositions that serve to break up a sentence (e.g., "while," "but"), particularly dual-toned verbatims that have two different tonalities (e.g., "Work culture has improved considerably while employee morale is low in the area I work in.")

The engine 107 then generates (206) tokens from each line of the unstructured text. A token is a segment of the line of unstructured delimited text that is separated by one or more spaces. For example, the engine 107 breaks the line "Work culture has improved considerably while employee morale is low in the area I work in" down into the following tokens: "work" "culture" "has" "improved" "considerably" "while" "employee" "morale" "is" "low" "in" "the" "area" "I" "work" "in." In some embodiments, the tokens are stored in the data store 108 as being associated with the line of unstructured text.

As can be appreciated, a token is a fundamental unit that a text processing system typically works with. By generating tokens from the unstructured text, the system 100 can apply sophisticated algorithms, e.g., to identify the part-of-speech of each token, form trigrams that are used for other modules like sentiment mining, clustering, and so forth. An exemplary software toolkit and related algorithms for implementing the extracting (204) and generating (206) steps described above are embodied in the Apache OpenNLP library for processing natural language text, available from the Apache Software Foundation.

The engine 107 then determines (208) one or more themes present in the unstructured text. A theme can comprise a keyword, a phrase cluster, a topic, and other similar items contained within the unstructured text. The techniques described herein contemplate two parts to theme identification. The first part is identification of dynamic themes. To identify dynamic themes, the engine 107 identifies the phrases in the text and then clusters these phrases based upon a) the similarity of each phrase with the others (e.g., "work" and "working" are likely to be in one cluster); and b) the presence of the phrases in the same verbatim. In other words, if two phrases occur frequently with each other, these phrases are likely to be put in one cluster. The clusters generated by the engine 107 form dynamic themes and the engine 107 assigns a topic name by selecting the most frequently occurring phrase in each cluster.

For example, a cluster may comprise the phrases:

{"401k account," "IRA account," "401k rollover," "401k account," "401k account"} based upon their similarity. Because the phrase "401k account" occurs most frequently in the cluster, the cluster is assigned topic or theme "401k account."

The second part of theme identification is identification using static themes (e.g., via a theme dictionary), which will be described in a later section of the specification.

Turning to FIG. 3, the detailed steps of determining one or more themes in the unstructured text are provided. The engine 107 identifies (302) candidate phrases based on the tokens and phrases from the searched phrases log 110. This is known as the Candidate Phrase Generation step. Examples of phrases identified could be "mobile app" and "IRA account." In some embodiments, the engine 107 utilizes the RAKE algorithm to generate an initial list of candidate phrases from the input tokens. RAKE is described in Stuart Rose et al., "Automatic keyword extraction from individual documents," Text Mining: Applications and Theory, pp. 1-20, John Wiley & Sons, Ltd., 2010, which is incorporated herein by reference. It should be appreciated that other algorithms can be used, such as a greedy algorithm that generates all unigrams/bigrams and trigrams.

The engine 107 also computes the frequency of each phrase in the verbatims. For example, the engine 107 can generate the following: {(mobile app, 54), (IRA account, 29)}, where 54 is the frequency count for "mobile app" in the verbatim file and 29 is the frequency count for "IRA account" in the verbatim file. Irrespective of the algorithm used, the engine 107 typically identifies a large number of phrases (in the order of hundreds of thousands). In order to accurately and efficiently rank the phrases, the engine 107 uses the search terms from the searched phrases log 110 and the number of times each phrase occurs in the searched phrases log 110. For example, the engine 107 can generate the following: {(mobile app, 54, 1250), (IRA account, 29, 2650)}, where 54 is the frequency count and 1250 is the number of times "mobile app" was searched on the specific website in a specific duration (e.g., the last month). In some embodiments, the engine 107 can aggregate the search term counts monthly and refresh them once a month.

The engine 107 then ranks (304) each of the candidate phrases based on frequency of a respective phrase in the unstructured delimited text, the search phrase frequency count corresponding to the respective phrase in the searched phrases log 110, and the clicked-on frequency count corresponding to the respective phrase in the phrase click log 111. This is known as the Candidate Phrase Ranker step. The engine 107 receives as input the candidate phrases identified in step 302 above. That is, the list of {phrase, frequency count, search term count}—e.g., {(mobile app, 54, 1250), (IRA account, 29, 2650)}. The engine 107 also receives clickstream data as input. For example, clickstream data can comprise a click count of URLs on the specific website that contains the candidate phrases. So, for example, if URL A has the phrase "mobile app" and this URL has a click count of one million for that month, the engine 107 uses this information to rank the phrases along with the frequency count and search term count provided by the Candidate Phrase Generation step. In this example, the click count refers to the monthly click count and is refreshed once a month—other durations can be used.

Because all possible phrases cannot typically be evaluated, the engine 107 selects (306) a subset of phrases from the candidate phrases, where the subset of phrases selected is based on the respective rank of each phrase. For example, the engine 107 can select only the top 'n' ranked phrases based upon suitable criteria. In some embodiments, the value of 'n' is input by a user of the system 100.

The table below provides an example of a ranked list of candidate phrases used by the invention described herein:

| Rank | Candidate Phrase | Score |
|------|------------------|-------|
| 1 | IRA account | 0.89 |
| 2 | mobile app | 0.83 |
| 3 | app usage | 0.54 |

The system 100 can compute the score for the candidate phrases in a number of different ways. In one example, the system 100 computes the score using the number of times a phrase occurs in the given verbatim, the number of times it is searched for (e.g., as represented in the searched phrases log 110), and/or the number of times the relevant URL in which it occurs is clicked on (e.g., as represented in the phrase click log 111). In this example, the final score calculation is a weighted normalized average of these three values and the phrases are sorted in descending order by score to come up with the ranked list.

The engine 107 then groups (308)—or clusters—the subset of phrases based on words in the subset of phrases. This is known as the Cluster Phrases step. The engine 107 takes as input the list of top 'n' phrases determined in step 306, and then clusters the top 'n' phrases using, e.g., a hierarchical clustering algorithm using a trigram similarity measure and the co-occurrence of phrases in verbatims. To demonstrate how the algorithm works, for example, if the phrases are {"401k account," "IRA account," "401k rollover," "mobile app," "app usage," "mobile problems"}, the table below indicates the presence or absence of each phrases in four example verbatims (V1 to V4), where 1 equals presence and 0 equals absence:

| | 401k account | IRA account | 401k rollover | mobile app | app usage | mobile problems |
|---|---|---|---|---|---|---|
| V1 | 1 | 1 | 1 | 0 | 0 | 0 |
| V2 | 1 | 1 | 0 | 0 | 0 | 0 |
| V3 | 0 | 0 | 1 | 1 | 0 | 1 |
| V4 | 0 | 0 | 0 | 1 | 1 | 1 |

If the number of expected output clusters is two, then based on co-occurrence, Cluster C1 contains {"401k account," "IRA account," "401k rollover"} and Cluster C2 contains {"mobile app," "app usage," "mobile problems"}.

The algorithm utilizes a trigram similarity measure which looks at similarity of phrases with one another based on the number of trigrams that match. A trigram is a 3-character string\ in the phrase. For example, the phrase "401k account" contains the following trigrams: A={401, 01k, acc, cco, cou, oun, unt} and the phrase "IRA account" contains the following trigrams: B={ira, acc, cco, cou, oun, unt}.

Based upon the above, the similarity score is 5/8, that is:

Similarity Score of sets A and B=(intersection of A and B)/(union of A and B).

Once the groups or clusters are generated, the engine 107 determines (310) a theme for each group by based on the number of times a phrase appears in the group. In one example, the engine 107 picks the phrase that has the maximum frequency count. For example, if {"401k account," "IRA account," "401k rollover"} is the cluster, and has a frequency count of {8, 5, 4} respectively, the engine 107 determines that the theme for the cluster should be "401k account" because that phrase has the maximum count of 8. In one embodiment, if there is more than one phrase with the maximum count, then the engine 107 can randomly picks one as the theme.

In some embodiments, the engine 107 can extract Product-Action-Opinion entities from the verbatims and associate these entities with the themes. For example, the engine 107 can identify and extract certain product names (e.g., a name of a 401k product and its variants). Similarly, the engine 107 can identify and extract competitor names and their variants. In another example, the engine 107 identifies and extracts opinion entities such as 'good,' 'bad' and the like. One such example is shown below, where 'improve' is an opinion entity:

"Please further improve the features and the functions of your mobile app (Android)."

In some embodiments, the engine 107 uses a dictionary to perform a look-up for the entity identification described here.

In some embodiments, the identified themes can be displayed to a user at client computing device 102 via GUI, and the user can edit, modify, and/or delete the presented themes. In one example, the engine 107 can generate an index text file containing the themes and transmit the index text file to the client computing device 102.

Figure 4:
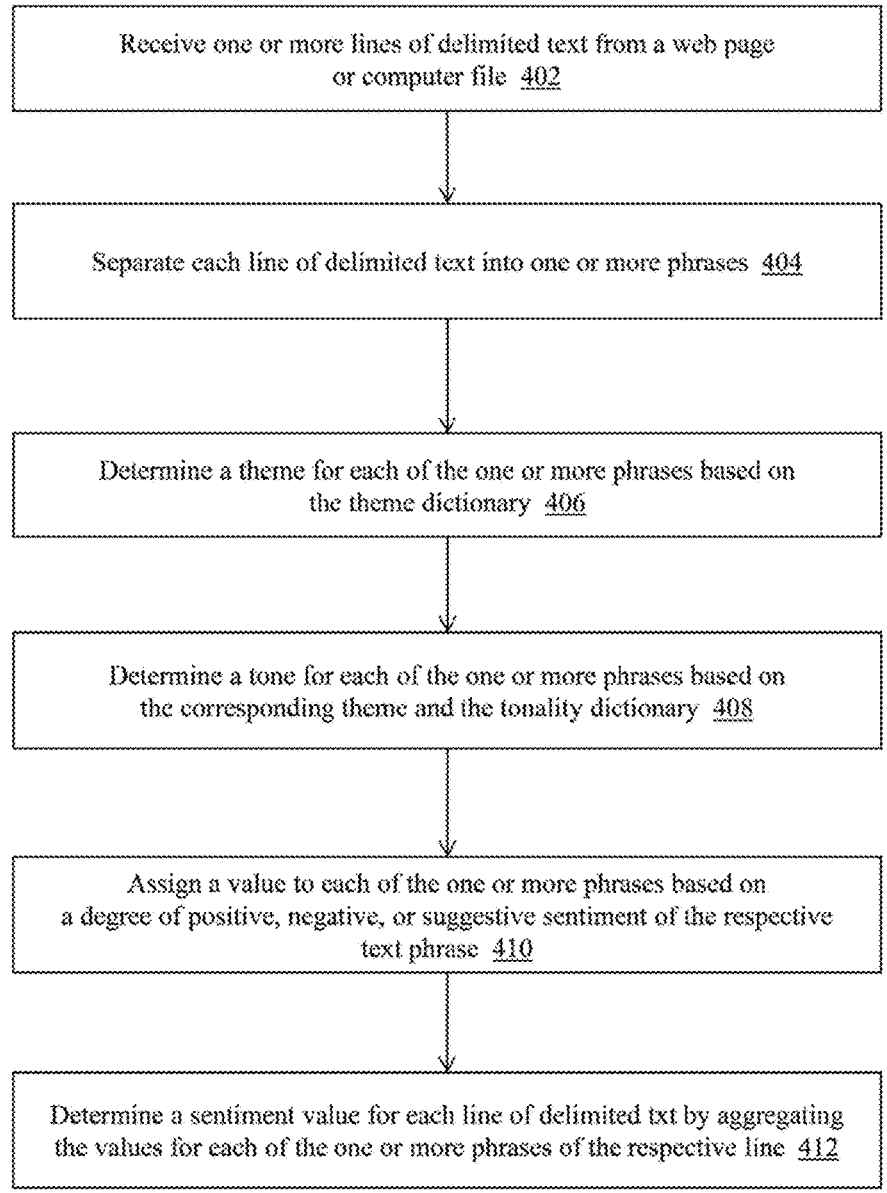
FIG. 4 is a flow diagram of a method for capturing computer text and analyzing the computer text for tonality and sentiment.

Another aspect of the present invention is determining tonality and sentiment associated with the unstructured text that is captured by the system 100. Tonality is useful in understanding sentiment associated with feedback provided by a customer or employee. FIG. 4 is a flow diagram of a method 400 for capturing computer text and analyzing the computer text for tonality and sentiment, using the system 100 of FIG. 1.

As shown in FIG. 4, the unstructured text analysis and extraction engine 107 receives (402) one or more lines of unstructured delimited text from a web page and/or a computer file (as described above with respect to FIG. 2). The engine 107 separates (404) (or splits) each line of unstructured delimited text into one or more phrases. Again, as described above, the engine 107 utilizes logic to locate a terminator within each line of unstructured text and split the line of text into multiple phrases at each terminator.

The engine 107 then determines (406) a theme for each of the one or more phrases generated by step 404 using the theme dictionary 112. The engine 107 can search each of the one or more phrases using the themes, phrases and/or keywords contained in the theme dictionary 112 in order to determine a matching theme. For example, if the phrase extracted by the engine 107 from the verbatim is "Your customer service for my IRA account is very good," the engine 107 can determine that the keyword "IRA account" is contained within the "401k account" theme and assigns the "401k account" theme with the specific phrase.

Next, the engine 107 determines (408) a tone for each of the one or more phrases based upon the corresponding theme. To determine the tone, the engine 107 executes the following algorithm:

1) The engine 107 determines a position of the keyword in the phrase. Using the above example of "Your customer service for my IRA account is very good," the engine 107 determines that the keyword "IRA account" is positioned in the middle of the phrase. In one embodiment, the engine 107 stores the entire phrase in an array, with one word in each array member (as follows):

| Array member | Word     |
|--------------|----------|
| 0            | Your     |
| 1            | customer |
| 2            | service  |
| 3            | for      |
| 4            | my       |
| 5            | IRA      |
| 6            | account  |
| 7            | is       |
| 8            | very     |
| 9            | good     |

The engine 107 determines that the keyword "IRA account" is positioned at array members 5 and 6 of the phrase. The engine 107 then searches the phrase in proximity to the keyword position to determine a tonality of the phrase. Continuing with the above example, the engine 107 moves up and down in the array, starting from the position of the keyword, and analyzes each word utilizing the tonality dictionary 113. For example, the engine 107 looks at the words in positions 4 through 0, and the words in positions 7 through 9, to determine tonality. In some embodiments, the engine 107 searches the positions around the identified keyword up to plus-n or minus-n words under the hypothesis that the tonality is typically placed or written close to the keyword or theme. In other words, the engine 107 only searches a predetermined range of positions around the keyword and not the entire phrase or sentence.

In some cases, however, the engine 107 does not find the tone within the predetermined range of positions around the keyword. In these cases, the engine 107 searches the phrase starting at the beginning (e.g., position 0) and starting at the end (e.g., position n) in order to locate the tone.

Continuing with the above example, the engine 107 determines that the word "good" at position 9 is indicative of tone because, e.g., the word "good" is identified in the tonality dictionary 113. The engine 107 then assigns (410) a value to each of the one or more phrases, where the value is based on a degree of positive, negative, or suggestive sentiment of the respective phrase. For example, the engine 107 determines that the word "good" indicates a moderately positive sentiment. In this case, the engine 107 can assign a neutral value to the phrase (e.g., 0) because it is only moderately positive. However, the engine 107 determines that the modifier "very" immediately precedes the word "good" in the phrase and therefore the segment "very good" indicates an extremely positive sentiment. In this case, the engine 107 can assign a positive value to the phrase (e.g., 1). It should be appreciated that certain words need not be associated with a modifier to be qualified as an extreme tonality (e.g., the word "humiliation" can be deemed an extremely negative word and thus be coded as −1).

Also, it should be appreciated that for dual-toned verbatims (e.g., "The managers are good but the work-life balance is very poor"), the engine 107 splits the verbatim into two phrases at the conjunction word "but" and analyzes each phrase individually. For example, for the phrase "The managers are good," the engine 107 determines that the keyword is "managers" and that the tone is "good"—and for the phrase "the work-life balance is very poor," the engine 107 determines that the keyword is "work-life balance" and the tone is "very poor." For the first phrase, the engine 107 assigns a value of 0 (indicating a moderately positive tone) and for the second phrase, the engine 107 assigns a value of −1 (indicating an extremely negative tone).

At this point, the engine 107 has tagged the entire verbatim with values for each phrase within. The engine 107 then determines (412) a sentiment value for each line of delimited text (aka verbatim) by aggregating the values for each of the one or more phases of the respective line. Using the above example, the engine 107 determines that the verbatim "The managers are good but the work-life balance is very poor" has a sentiment value of −1 (i.e., 0+(−1)).

Below are additional examples of how the engine 107 assigns a value to each phrase in a verbatim and how those values are aggregated to determine a sentiment value:

EXAMPLE 1

Verbatim: "The cost of living keeps increasing but so does our health insurance and the raise pool seems to keep going down which makes it very tough."
Phrase 1: "The cost of living keeps increasing"
Phrase 2: "so does our health insurance"
Phrase 3: "the raise pool seems to keep going down which makes it very tough"
Themes: Compensation (keywords=cost of living, raise pool), Benefits (keyword=health insurance)
Tone: "keeps increasing," "keep going down," "very tough"
Value for Phrase 1: −1
Value for Phrase 2: −1
Value for Phrase 3: −1
Sentiment Value for Verbatim: −3=Negative

EXAMPLE 2

Verbatim: "We do a great job of making the customer aware when we mess up, and I think our reputation is outstanding in the eyes of outsiders."
Phrase 1: "We do a great job of making the customer aware when we mess up"
Phrase 2: "I think our reputation is outstanding in the eyes of outsiders"

Themes: Customer Focus (keyword=customer); Organization (keyword=reputation)
  Tone: "great job," "outstanding"
  Value for Phrase 1: +1
  Value for Phrase 2: +1
  Sentiment Value for Verbatim: +2=Positive Another application of the above-described techniques is the ability to understand sarcasm patterns exhibited in verbatims captured by the system 100. As can be expected, sarcasm patterns may use words that indicate a certain tone when in fact the intention is to convey the opposite tone. For example, the verbatim "It is amazing how people with little or no social awareness and even less intelligence are able to shape policy" includes a word with positive tonality ("amazing") and several words with negative tonality ("little or no social awareness," "less intelligence"), but the context of the verbatim is that the word "amazing" is being used in a sarcastic way.

The engine 107 is capable of interpreting and accounting for the sarcasm when analyzing the verbatim using the techniques described above. For example, the engine 107 identifies the main context being discussed in the verbatim (e.g., "people with little or no social awareness and even less intelligence") and splits the verbatim into phrases: pre-context, context, post-context, as indicated below:

| Pre-context | Context | Post-context |
| --- | --- | --- |
| "It is amazing how" | "people with little or no social awareness and even less intelligence" | "are able to shape policy" |

The engine 107 then searches the context phrase for a tonality (e.g., starting at the word "people"). Using the above example, the engine 107 determines that the tone of the context phrase is negative (e.g., "little or no social awareness" and "less intelligence" are negative). The engine 107 then searches the pre-context and post-context phrases for tonality, and determines that the tone of the pre-context phrase is positive (e.g., "amazing") and the tone of the post-context phrase does not have a tone (e.g., no tonality words present). The engine 107 determines that because the pre-context phrase is positive, followed by a context phrase that is negative, the verbatim is sarcastic and thus the pre-context tonality is not afforded weight in determining the sentiment value of the verbatim. The engine 107 then tags the theme "policy" with the sarcasm and negative sentiment value.

Method steps can be performed by one or more special-purpose processors executing a computer program to perform functions of the invention by operating on input data and/or generating output data. Method steps can also be performed by, and an apparatus can be implemented as, special-purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special-purpose microprocessors. Generally, a processor receives instructions and data from a read-only memory or a random access memory or both. The essential elements of a computer are a specialized processor for executing instructions and one or more specifically-allocated memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system used in a computing environment in which unstructured computer text is analyzed for theme generation to determine sentiment, the system comprising:
   a computer store including unstructured text that is delimited, a searched phrases log, and a phrase click log,
      the unstructured text being input via a web page, input directly into the computer store via a first computer file, or any combination thereof,
      the searched phrases log comprising a) a unique set of phrases from all phrases that are searched on one or more specified websites for a specified duration and b) a search phrase frequency count indicating the number of times of the phrases within the unique set of phrases was searched on the one or more specified websites over the specified duration, the searched phrases log being i) retrieved from the internet and stored in the computer store via a second computer file, ii) input directly into the computer store via a third computer file, or any combination of i) and ii), and
      the phrase click log comprising a) a unique set of phrases from all phrases that correspond to one or more Uniform Resource Locators (URLs) that are activated for a specified duration and b) a clicked-on frequency count indicating the number of times of the URLs associated with the phrases in the unique set of phrases are activated over the specified duration, the phrase click log is i) retrieved from the internet and stored in the computer store via a fourth computer file, ii) input via a webpage, input directly into the computer store via a fifth computer file, or any combination of i) and ii), and
   a computer server in communication with the computer store and programmed to:
      extract phrases from the unstructured delimited text by splitting each line of the unstructured delimited text into one or more phrases;
      generate tokens from the unstructured delimited text, wherein the tokens comprise segments of the unstructured delimited text;
      determine one or more themes present in the unstructured delimited text by:
         a) identifying candidate phrases based on the tokens and the searched phrases log,
         b) ranking each of the candidate phrases based on frequency of a respective phrase in the unstructured delimited text, the search phrase frequency count corresponding to the respective phrase, and the clicked-on frequency count corresponding to the respective phrase,
         c) selecting a subset of phrases from the candidate phrases, where the subset of phrases selected is based on the respective rank of each phrase,
         d) grouping the subset of phrases based on words in the subset of phrases, and
         e) determining themes for each grouping based on the number of times a phrase appears in the group.

2. The system of claim 1 wherein grouping the subset of phrases is based on trigrams in the subset of phrases that substantially match.

3. The system of claim 1 wherein grouping the subset of phrases is based on a co-occurrence of matching words in the subset of phrases.

4. The system of claim 1 wherein determining themes further comprises picking the phrase that appears in the group a highest number of times.

5. A computerized method for analyzing unstructured computer text for theme generation to determine sentiment, the method comprising:
   storing, by a computer store, unstructured text that is delimited, a searched phrases log, and a phrase click log,
      wherein the unstructured text is input via a web page, input directly into the computer store via a first computer file, or any combination thereof,
      wherein the searched phrases log comprises a) a unique set of phrases from all phrases that are searched on one or more specified websites for a specified duration and b) a search phrase frequency count indicating the number of times of the phrases within the unique set of phrases was searched on the one or more specified websites over the specified duration, the searched phrases log being i) retrieved from the internet and stored in the computer store via a second computer file, ii) input directly into the computer store via a third computer file, or any combination of i) and ii), and wherein the phrase click log comprises a) a unique set of phrases from all phrases that correspond to one or more Uniform Resource Locators (URLs) that are activated for a specified duration and b) a clicked-on frequency count indicating the number of times of the URLs associated with the phrases in the unique set of phrases are activated over the specified duration, the phrase click log being i) retrieved from the internet and stored in the computer store via a fourth computer file, ii) input via a webpage, input directly into the computer store via a fifth computer file, or any combination of i) and ii);

extracting, by a computer server in communication with the computer store, phrases from the unstructured delimited text by splitting each line of the unstructured delimited text into one or more phrases;

generating, by the computer server, tokens from the unstructured delimited text, wherein the tokens comprise segments of the unstructured delimited text; and determining, by the computer server, one or more themes present in the unstructured delimited text by:
  a) identifying candidate phrases based on the tokens and the searched phrases log,
  b) ranking each of the candidate phrases based on frequency of a respective phrase in the unstructured delimited text, the search phrase frequency count corresponding to the respective phrase, and the clicked-on frequency count corresponding to the respective phrase,
  c) selecting a subset of phrases from the candidate phrases, where the subset of phrases selected is based on the respective rank of each phrase,
  d) grouping the subset of phrases based on words in the subset of phrases, and
  e) determining themes for each grouping based on the number of times a phrase appears in the group.

6. The method of claim 5 wherein grouping the subset of phrases is based on trigrams in the subset of phrases that substantially match.

7. The method of claim 5 wherein grouping the subset of phrases is based on a co-occurrence of matching words in the subset of phrases.

8. The method of claim 5 wherein the step of determining themes further comprises picking the phrase that appears in the group a highest number of times.

\* \* \* \* \*